United States Patent
Grabb et al.

(10) Patent No.: US 6,459,741 B1
(45) Date of Patent: Oct. 1, 2002

(54) IMPLEMENTATION OF N-VSB TRAINING SEQUENCES IN N-SQUARED QAM RECEIVER STRUCTURES

(75) Inventors: Mark Lewis Grabb, Burnt Hills; John Erik Hershey, Ballston Lake; Kenneth Brakeley Welles, II, Scotia, all of NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/422,450

(22) Filed: Oct. 21, 1999

(51) Int. Cl.$^7$ .................................................. H04L 5/12
(52) U.S. Cl. ....................... 375/261; 375/321; 329/306; 332/103
(58) Field of Search ................................ 375/261, 270, 375/298, 301, 321; 329/304, 306, 357; 332/103, 170

(56) References Cited

U.S. PATENT DOCUMENTS 5,982,457 A * 11/1999 Limberg ...................... 348/554
6,118,498 A * 9/2000 Reitmeier ................... 348/725

* cited by examiner

Primary Examiner—Don N. Vo
(74) Attorney, Agent, or Firm—John F. Thompson; Jill M. Breedlove

(57) ABSTRACT

Training sequences designed for N-VSB systems within the embodiment of an N-squared QAM receiver facilitate designing 8-VSB receivers using methodologies of 64-QAM receiver design. A receiver designed using such methodologies converts the received modulation into a signal which can be accepted by circuitry for decoding 64 level quadrature-amplitude modulation (64-QAM) signals. This process provides a better signal to noise ratio reception than the conventional I-channel only decoding circuitry of most 8-VSB receivers. This process also employs training and equalizing algorithms developed for 64-QAM receivers which are superior to equivalent algorithms for 8-VSB receivers. The invention can be generalized to N-VSB conversion into M-QAM where $M=N^2$. Adaptive equalization algorithms for 8-VSB transmissions implemented within the context of the 64 QAM receiver are superior to present single-channel VSP processing receivers. Present 64 QAM equalization strategies can be employed when receiving an 8-VSB waveform, given removal of the pilot tone and time offset, except when employing a training sequence. Modifications to the 8-VSB training sequence specification are employed for operation within a 64 QAM receiver design.

6 Claims, 4 Drawing Sheets

IMPLEMENTATION OF N-VSB TRAINING SEQUENCES IN N-SQUARED QAM RECEIVER STRUCTURES

STATEMENT REGARDING FEDERALLY SPONSORED RESEARCH & DEVELOPMENT

The U.S. Government may have certain rights in this invention pursuant to the NIST Contract Number 70NANB8H4078, awarded by the National Institute of Standards and Technology.

BACKGROUND OF THE INVENTION

1. Technical Field

This invention relates to Digital Television (DTV) and, in particular, to the use of training sequences designed for N-VSB (N-vestigial sideband modulation) systems, as generally specified in the ATSC (Advanced Television Standards Committee) television standards, within the embodiment of an N-squared QAM (Quadrature Amplitude Modulation) receiver. Additionally, this invention relates to the use of QAM and/or offset (also known as "staggered") equalization algorithms for the purpose of receiving N-VSB DTV signals, as generally specified in the ATSC television standards.

2. Background Art

Digital television (DTV) signals in the USA are broadcast using the Advanced Television Standards Committee (ATSC) television standard modulation system which is eight level vestigial sideband (8-VSB) modulation with a suppressed carrier signal. Conventional 8-VSB receiver designs complex demodulate the received signal with a pilot tone on zero frequency. Under ideal channel conditions, this allows the data symbols to stream on only one of two complex demodulated channels (known as I-channel only processing).

N-VSB, where N equals 8, is the modulation selected for the ATSC standard for terrestrial broadcast of digital television in many countries, including the United States. N equals 16, or 16-VSB, has been proposed as a standard by the ATSC for wired transmission of digital television.

Currently published 8-VSB receiver designs employ equalization algorithms that operate at baseband on only one of the two channels which result from complex demodulation. Modifications to the N-VSB received signal have been developed to allow use of an N-squared QAM (Quadrature Amplitude Modulation) receiver structure. Use of the training sequences designed for the 8-VSB standard will require modification when used within the 64-QAM structure.

Adaptive equalization filters have been used in an attempt to mitigate the distortion effects of the propagation channel. Filter coefficients are adapted through a variety of mechanisms, but all mechanisms are based on estimating an error. The error estimate is used to adjust the adaptive filter coefficients. A few classes of equalization algorithms are summarized below by summarizing how an error vector is formed.

Decision Directed

The error is formed by forcing a decision on each symbol value, assuming the decision is correct, and forming an error between the decision and the received symbol value.

Training Sequence

The error is formed between the stored training sequence symbol value and the received symbol value.

Blind (Reduced Constellation Algorithm)

The error is formed by forcing a decision on each symbol value, where the decisions are selected from a reduced and possibly modified set of decision values and decision boundaries.

Blind (Property Restoration)

The error is formed between an estimate of a constant property of the distortionless waveform and the property computed from the received waveform.

A multitude of equalization algorithms have been developed for 64 QAM algorithms (see, for example, Richard Gitlan, Data Communication Principles). Improvements upon these algorithms for "staggered" or "offset" modulations have been developed by researchers in the field (see, for example, Jerry C. Tu, "Optimum MMSE Equalization for Staggered Modulation", *IEEE Comm.*, pp. 1401–1406, 1993).

BRIEF SUMMARY OF THE INVENTION

Training sequences designed for N-VSB systems are used within the embodiment of an N-squared QAM receiver, allowing 8-VSB receivers to be designed using methodologies of 64-QAM receiver design. In particular, a receiver designed using such methodologies converts the received modulation into a signal which can be accepted by circuitry for decoding 64 level quadrature-amplitude modulation (64-QAM) signals. This process provides better signal to noise ratio (SNR) reception than the conventional I-channel only decoding circuitry of most 8-VSB receivers. This process also allows use of training and equalizing algorithms developed for 64-QAM receivers which are superior to equivalent algorithms for 8-VSB receivers. This invention can be generalized to N-VSB conversion into M-QAM where $M=N^2$.

The 8-VSB ATSC training sequence can be converted to a two channel QAM sequence by first selecting every other symbol and then inverting every other symbol in each of the QAM symbols. This method can be realized by changing the stored sequence in the receiver memory. A preferred embodiment is an adaptation to the m-sequence generator structure described in detail in a subsequent section.

With a proper QAM training sequence, all QAM or offset QAM modulation equalization algorithms employing a training sequence may be applied in receiving an N-VSB (including the 8-VSB ATSC) digital television signal.

Adaptive equalization algorithms for 8-VSB transmissions implemented within the context of a 64 QAM receiver are superior to present single-channel VSB processing receivers (for example, the DTV Grand Alliance Receiver). Present 64 QAM equalization strategies can be employed when receiving an 8-VSB waveform, given removal of the pilot tone and time offset, except when employing a training sequence. Modifications to the 8-VSB training sequence specification are employed for operation within a 64 QAM receiver design.

DETAILED DESCRIPTION OF THE INVENTION

Figure 1:
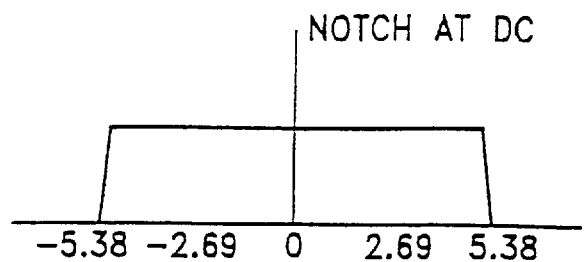
FIG. 1 is a graphical representation of the frequency spectra of an 8-VSB signal.
Figure 2:
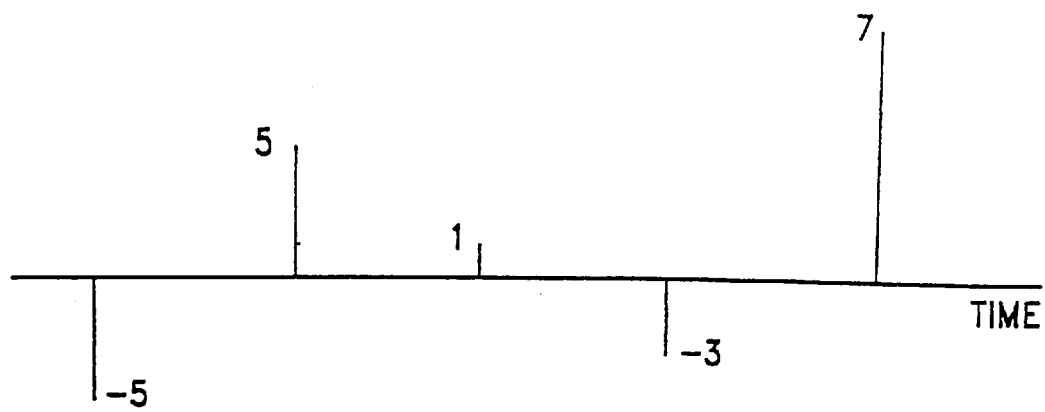
FIG. 2 is a graphical representation of the eight symbol levels of the 8-VSB signal.

FIG. 1 illustrates graphically the 8-VSB signal spectrum. The MPEG-2 (Motion Picture Experts Group) packets comprise 208 bytes or 1664 bits corresponding to 832 symbols. There are eight symbol levels (−7, −5, −3, −1, 1, 3, 5, 7), as generally shown in FIG. 2.

Figure 3:
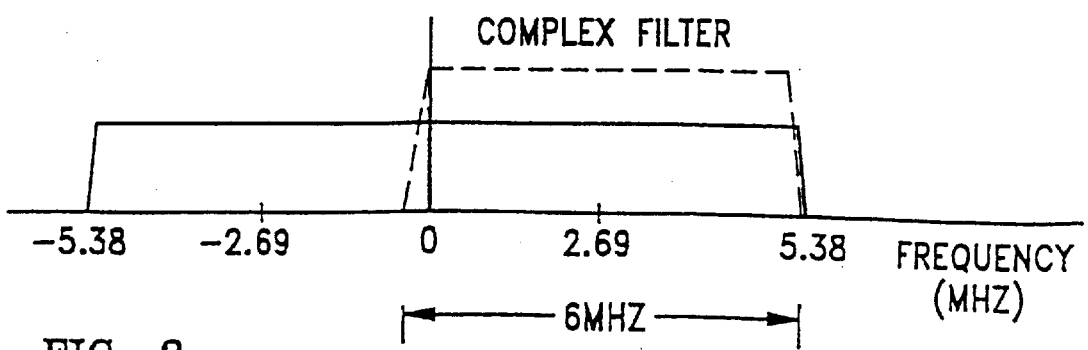
FIG. 3 is a graphical representation of the passband of a complex filter used to recover the I-channel at the receiver.

A pilot tone is included in the 8-VSB signal design. The symbol values entering a zero-ISI VSB filter are offset by a DC value to generate the pilot tone. This approach causes the pilot tone to have a particular phase with respect to the symbol detection timing. Present receiver implementations may lead to a conclusion that this phase is of no consequence when I-channel only receiver processing is conducted, because the pilot tone is used for frequency acquisition only. A complex filter is used to generate the I-channel, as illustrated in FIG. 3.

8-VSB modulation can be converted (through one-to-one reversible mapping) to 64-QAM through four independent steps. These steps are not necessarily order dependent.

1. ¼ symbol rate frequency shift
2. pilot tone
3. symbol timing offset between I and Q channels
4. alternating inversion of data symbols.

By implementing each or some of these conversions, the 8-VSB waveform may be processed using methodologies commonly applied to 64-QAM receiver designs.

¼ Symbol Rate Frequency Shift

Common 8-VSB receiver designs complex demodulate the received signal with a pilot tone centered on zero frequency. Under ideal channel conditions, this allows the data symbols to stream on only one of the two complex demodulated channels (known as I-channel only processing). By shifting the waveform ¼ the symbol rate in frequency and thus centering the waveform spectrum about zero Hertz prior to complex demodulation, data symbols alternately appear on the I and Q channels during the complex demodulation process. These data symbols occur on each of the two channels at half the symbol rate. These data symbols are not directly the 8-VSB symbols; however, a direct mapping is achieved through two more steps (pilot tone and alternating inversion of data symbols).

Pilot Tone

The standard implementation for adding a pilot tone (DC offset) causes the symbols on the I and Q channels to alternate with a positive and negative bias. Other implementations of the pilot tone can be used to significant advantage at the receiver. That is, the phase of the pilot tone can be constructed to have no impact on the I-channel symbols and maximum bias impact on the Q-channel symbols. This can be used to aid the receiver in phase synchronization as well as other receiver processing. Removal of the pilot tone eliminates the bias in both the I and Q channels.

Alternating Inversion of Symbols

Based on a mathematical formulation of the complex frequency shift of ¼ the symbol rate, the data symbols on each of the I and Q complex demodulated channels are inverted (multiplied by −1) on every other symbol. By synchronizing to the pilot tone, this inversion can be inverted to obtain the original 8-VSB symbol stream within the 64-QAM receiver structure.

Symbol Timing and Offset Between I and Q Channels

In addition to the three other transformations to map 64-QAM to 8-VSB and vice versa, the symbols between the I and Q channels are offset by the original 8-VSB symbol rate. Receiver architectures to implement this re-alignment are common. Modulations of this type are commonly known as "offset". An appropriate delay is added to one of the complex demodulated channels to align the appropriate sampling times on the complex waveform. This is common in OQPSK (Offset Quadrature Phase Shift Keying) receiver design.

Implementation

Figure 4:
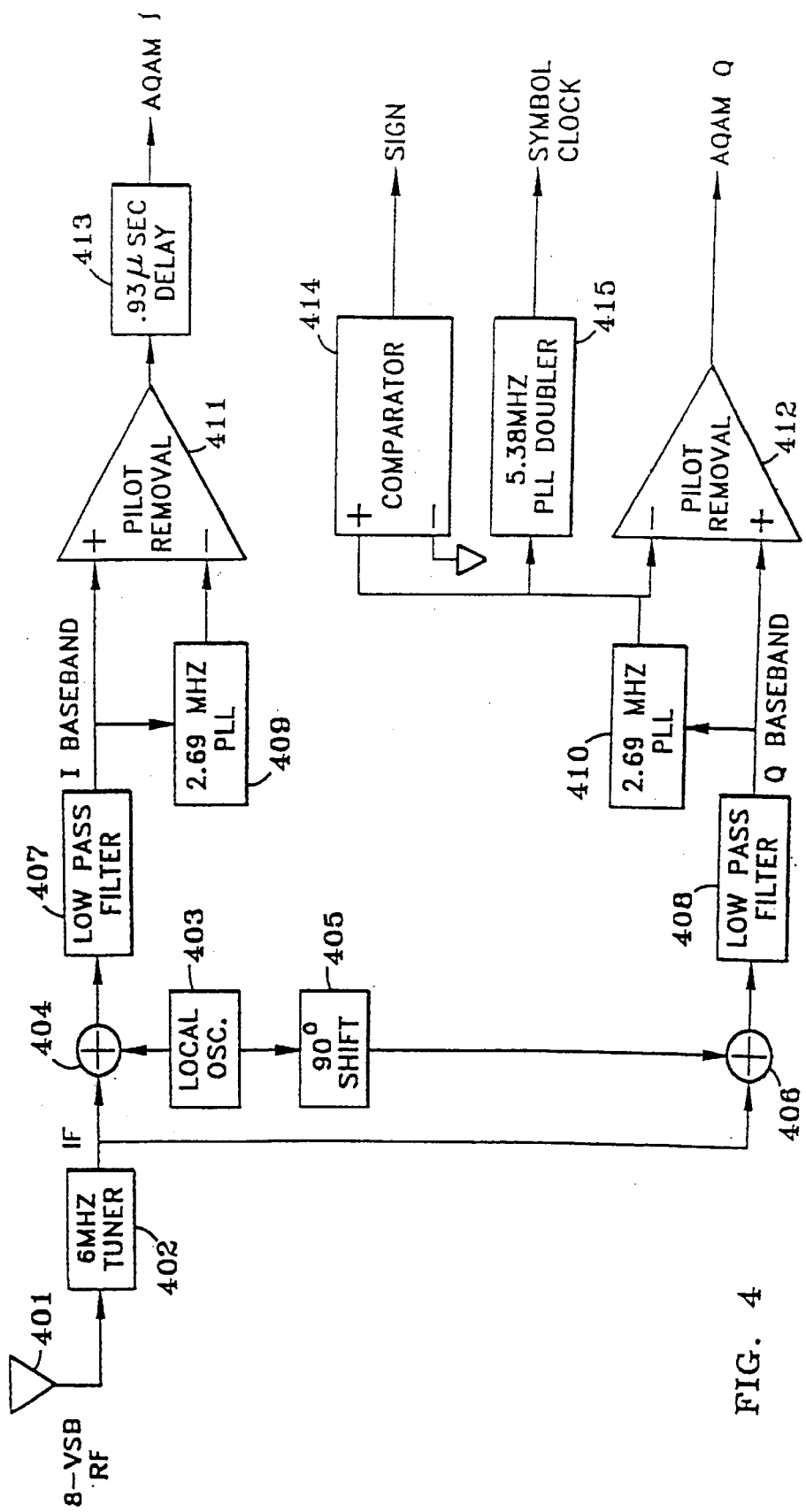
FIG. 4 is a block diagram of an illustrative implementation for converting a received 8-VSB signal to alternating quadrature signals in accordance with a preferred embodiment of the invention.

FIG. 4 shows an implementation of the invention. An antenna 401 provides a received 8-VSB digital signal, such as that defined by the ATSC digital television broadcast standard, to a tuner 402 which converts this signal to an intermediate frequency (IF) signal that has been bandpass filtered, as is well known in conventional television receiver circuitry. The signal from a local oscillator 403 operating at the intermediate frequency is mixed with the 8-VSB signal both in phase, in a mixer 404 and, via a 90° phase shifter 405, in quadrature, in a mixer 406. The output signals from mixers 404 and 406 are filtered through low pass filters 407 and 408, respectively, resulting in I and Q baseband signals. Each of these signals goes into separate respective 2.69 MHz PLL (Phase Locked Loops) 409 and 410, respectively, which lock onto the suppressed carrier signal and detect the pilot signals. Operational amplifiers 411 and 412 then remove the pilot signal from the I and Q signals, respectively. The signal on the I path undergoes a 0.93 microsecond ($\mu$sec) delay relative to the signal on the Q path in a delay circuit 413. This generates AQAM-I and AQAM-Q (Alternating Quadrature Amplitude Modulation) signals. The output signal of PLL 410 in the Q path is supplied to a comparator 414 which generates a SIGN output signal test alternates between a logical "1" and a logical "0" when the detected pilot signal is positive and negative, respectively. The output signal of PLL 410 in the Q path is also supplied to a 5.38 MHz PLL frequency doubler 415. The output signal of the frequency doubler is the symbol clock.

Figure 5:
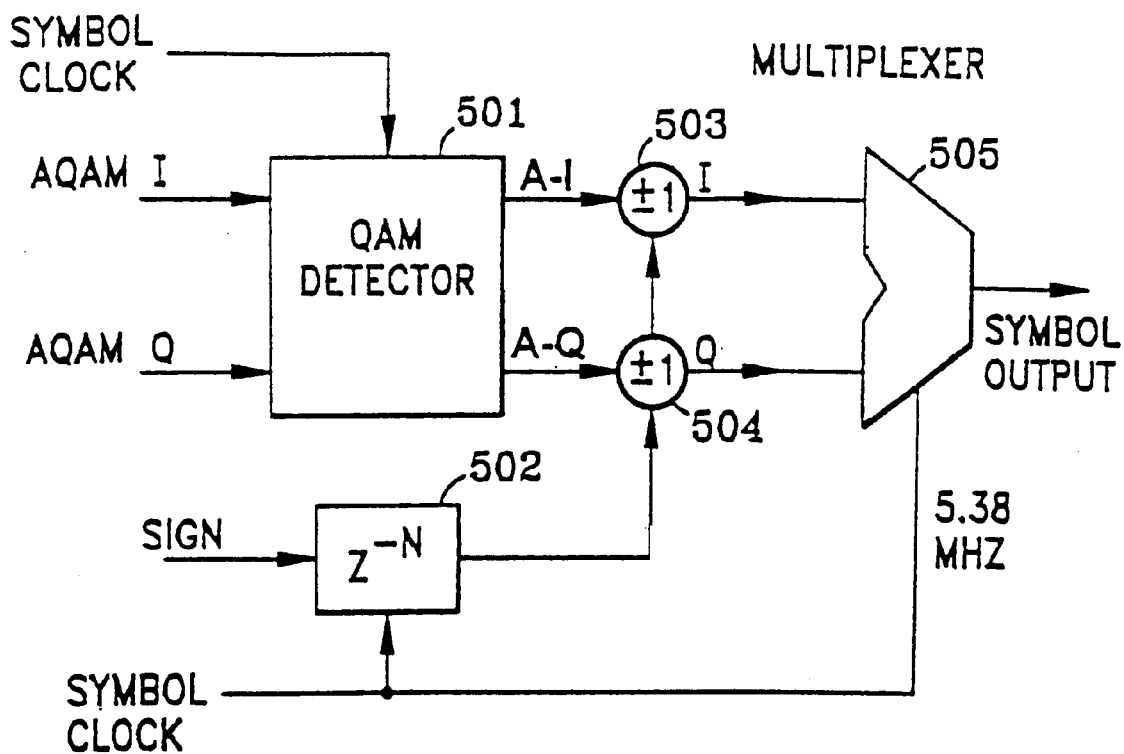
FIG. 5 is a block diagram of a quadrature amplitude modulation (QAM) detector and multiplexer for generating a recovered 8-VSB data symbol output signal.

FIG. 5 shows the AQAM-I and AQAM-Q signals going into a QAM detector 501. The circuitry for this QAM detector may be any circuitry for a conventional QAM detector which is well known and well understood in the field of communications. The AQAM signals going into the QAM detector 501 have all of the characteristics of normal QAM signals and may be treated as such.

QAM detector 501 puts out an I and a Q decision once per symbol clock. These are labeled "AI" and "AQ" for alternating I and Q because the symbol values from the QAM are alternately the positive and negative representation of the 8-VSB signals originally encoded in the radio frequency (RF) transmission. The SIGN output signal from amplifier 414, shown in FIG. 4, is delayed by N symbol clocks in a delay 502, where N is the delay introduced into signals passing from the input to the output of QAM detector 501. The delayed SIGN signal is used to control inverter circuits 503 and 504 to alternate the sign of the digital representation of the signals coming from the QAM detector 501. The sign corrected I and Q symbol values are multiplexed in multiplexer 505 by the symbol clock, which switches at a 5.38 MHz clock rate. This means that the data rate of the data presented on the output of the multiplexer (SYMBOL OUTPUT) is 10.69 MHz. These symbol data are the recovered 8-VSB symbol data in the proper order and with the proper sign.

The implementation shown in FIGS. 4 and 5 uses mostly analog circuitry for purposes of illustration. A digital implementation as well as a software based implementation may be constructed as well, as will be evident to those skilled in the digital television arts.

The implementation shown in FIGS. 4 and 5 requires that the 8-VSB training sequence be modified for use in the 64-QAM receiver. This is done by first separating the training sequence into two training sequences by parsing alternating symbol values from the 8-VSB sequence. These subsequences may be referred to as A and B. Next, every other symbol in each training subsequence (A and B) must be inverted (sign change). When the 8-VSB training sequence is a maximal-length sequence, the resulting modified training subsequences (A and B) can be stored efficiently using a generator and a seed. Otherwise, the subsequences (A and B) can be stored in memory. Given the modified training sequence, practices known in the art of receiver design can be employed to form updates to the equalization filter(s).

An important aspect of the training sequences is that they are m-sequences. The 8-VSB ATSC training sequence can be converted to the two channel QAM sequences by first selecting every other symbol and then inverting every other symbol in each of the QAM channels. By selecting every other symbol from an m-sequence, the generator polynomial is invariant; i.e., the feedback circuitry is the same. Thus, the same m-sequence generator may generate both of the QAM channel sequences. What is needed is a different feedforward logic for one of the QAM channels.

Figure 6:
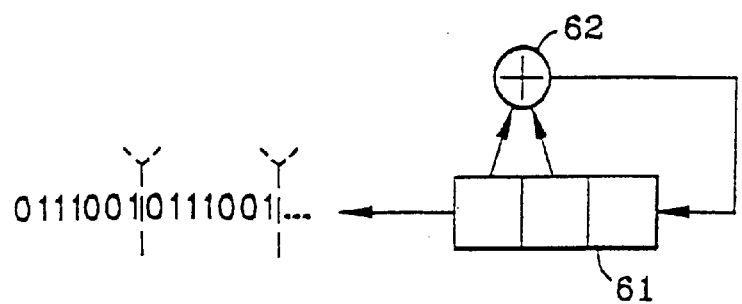
FIG. 6 is a logic diagram of an m-sequence generator.

The m-sequence generator shown in FIG. 6 may be considered as an example. The generator comprises a three-stage shift register 61 and an exclusive OR (XOR) gate 62 having its input connected to the second and third stages of the shift register and its output connected as a feedback signal to the first stage of the shift register. This generator produces the period seven m-sequence generated by the primitive three polynomial $x^3+x^2+1$. When initially loaded with the shift register contents 011, this generator yields the period seven sequence 0111001.

Figure 7:
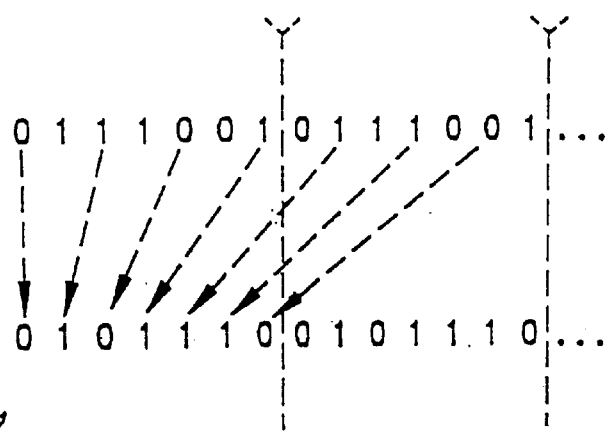
FIG. 7 is a table showing derivation of an "I" channel QAM training sequence.

For purposes of this description, it is assumed that the ATSC sequence uses this period seven m-sequence with phase as shown in FIG. 6; i.e., bit 1 is a zero, bit 2 is a one, bit 3 is a one, . . . , bit 7 is a one. Now, for instance, to generate the "I" channel QAM training sequence, taking every other bit of the ATSC training sequence yields an m-sequence of period 7 and of a cycle 0101110, as illustrated in FIG. 7.

Figure 8:
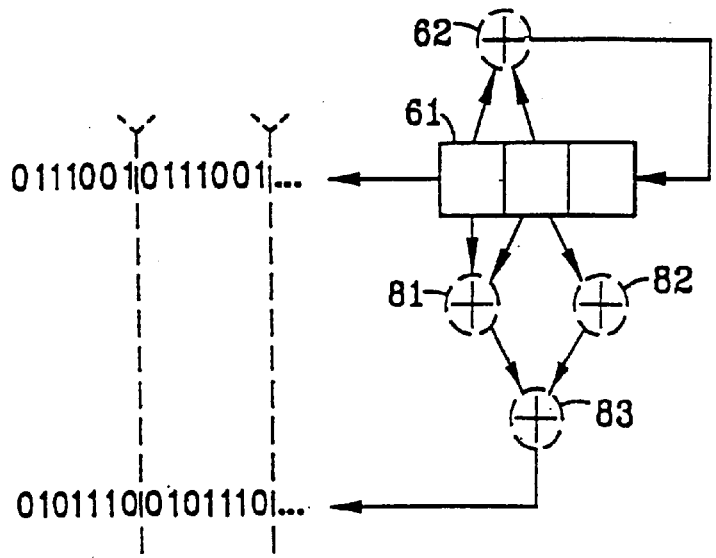
FIG. 8 is a logic diagram showing the m-sequence generator of FIG. 6 with feedforward logic to derive the "I" channel QAM training sequence of FIG. 7.

Another m-sequence generator need not be constructed, as the progenitor of the QAM "I" training sequence will have the same primitive polynomial and hence the same shift register length and feedback structure. All that is needed is to find the appropriate feedforward structure. This is a straightforward task to practitioners skilled in the art of binary sequence generation and, for the example under consideration, there is the structure shown in FIG. 8. Shift register 61 and XOR gate 62 have the same structure as that shown in FIG. 6. The feedforward structure comprises XOR gates 81, 82 and 83. The inputs of XOR gate 81 are coupled to the second and third stages of the shift register 61, the inputs of XOR gate 82 are coupled to the first and second stages of the shift register 61, and the inputs of XOR gate 83 are coupled to the outputs of XOR gates 81 and 82. Just as the ATSC sequence was decimated by a factor of 2 to generate the progenitor of the QAM "I" sequence through the feedforward logic (the XOR logic tree), it is possible to add additional feedforward logic (i.e., another XOR logic tree) to generate the progenitor of the QAM "Q" sequence. Once the progenitors of the QAM "I" and "Q" sequences have been generated, the final sequences are generated by alternate symbol inversions.

The training sequence can be employed in a receiver without removal of the pilot tone or re-alignment of the offset by alternating the symbol value tables for every other symbol and implementing a staggered receiver design, respectively.

For blind equalization, 64 QAM techniques may be directly employed if the 8-VSB to 64 QAM receiver circuitry is employed.

For decision directed equalization, 64 QAM techniques may be directly employed if the 8-VSB to 64 QAM receiver circuitry is employed.

While only certain preferred features of the invention have been illustrated and described, many modifications and changes will occur to those skilled in the art. For example, while the system has been described in terms of 8-VSB and 64 QAM techniques, the described techniques apply, without loss of generality to any N-VSB and N-squared QAM system. It is, therefore, to be understood that the appended claims are intended to cover all such modifications and changes as fall within the true spirit of the invention.

What is claimed is:

1. A method of using training sequences designed for an N-VSB (vestigial sideband) modulation signal in which the N-VSB modulation signal is converted into an M-QAM (quadrature amplitude modulation) signal, where $M=N^2$, comprising the steps of:

parsing alternating symbol values of training sequences from the N-VSB modulation signal to generate first and second subsequences;

inverting every other symbol in said first and second subsequences; and converting the N-VSB modulation signal including the first and second subsequences into an M-QAM signal.

2. The method of using training sequences designed for an N-VSB modulation signal in which the N-VSB modulation signal is converted into an M-QAM signal as recited in claim 1, wherein the step of converting the N-VSB modulation signal comprises the steps of:

shifting a symbol rate frequency of a received N-VSB modulation signal to center the spectrum of the N-VSB waveform about zero Hertz prior to complex demodulation so that data symbols will alternately appear on an I and a Q channel of the complex demodulation process;

removing a pilot tone from the received N-VSB modulation signal to eliminate any bias in both of the I and Q channels;

offsetting symbol timing between I and O channels;

quadrature amplitude demodulating the I and Q channels to generate alternating I and Q channel data symbols; and alternating inversion of the alternating I and Q channel data symbols to recover the N-VSB symbol data.

3. The method of using training sequences designed for an N-VSB modulation signal in which the N-VSB modulation signal is converted into an M-QAM signal as recited in claim 1, further comprising the step of generating said training sequences with an m-sequence generator.

4. The method of using training sequences designed for an N-VSB modulation signal in which the N-VSB modulation signal is converted into an M-QAM signal as recited in claim 3, wherein the step of generating said training sequences with an m-sequence generator comprises generating first and second subsequences.

5. A receiver for using training sequences designed for an N-VSB (vestigial sideband) modulation signal in which the N-VSB modulation signal is converted into an M-QAM (quadrature amplitude modulation) signal, where $M=N^2$, comprising:

means for parsing alternating symbol values of training sequences from the N-VSB modulation signal to generate first and second subsequences;

means for inverting every other symbol in said first and second subsequences; and means for converting the N-VSB modulation signal including the first and second subsequences into an M-QAM signal.

6. The receiver for using training sequences designed for an N-VSB modulation signal in which the N-VSB modulation signal is converted into an M-QAM signal recited in claim 5, wherein the means for converting the N-VSB modulation signal comprises:

means for shifting a symbol rate frequency of a received N-VSB modulation signal to center the spectrum of the N-VSB waveform about zero Hertz prior to complex demodulation so that data symbols will alternately appear on an I and a Q channel of the receiver;

means for removing a pilot tone from the received N-VSB modulation signal to eliminate any bias in both of the I and Q channels;

means for offsetting symbol timing between I and Q channels;

means for quadrature amplitude demodulating the I and Q channels to generate alternating I and Q channel data symbols; and means for alternating inversion of the alternating I and Q channel data symbols to recover the N-VSB symbol data.

\* \* \* \* \*